Patented Apr. 26, 1932

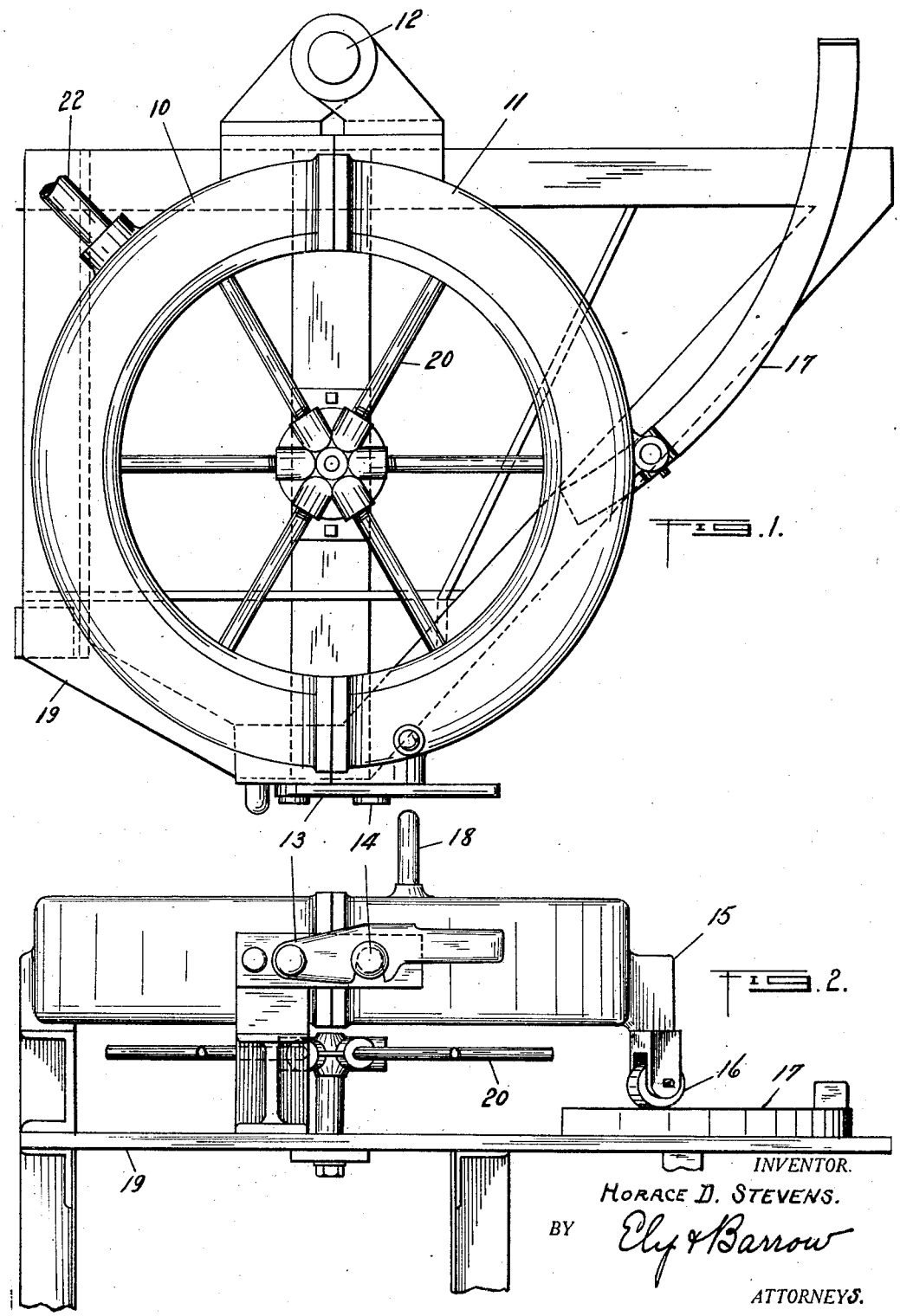

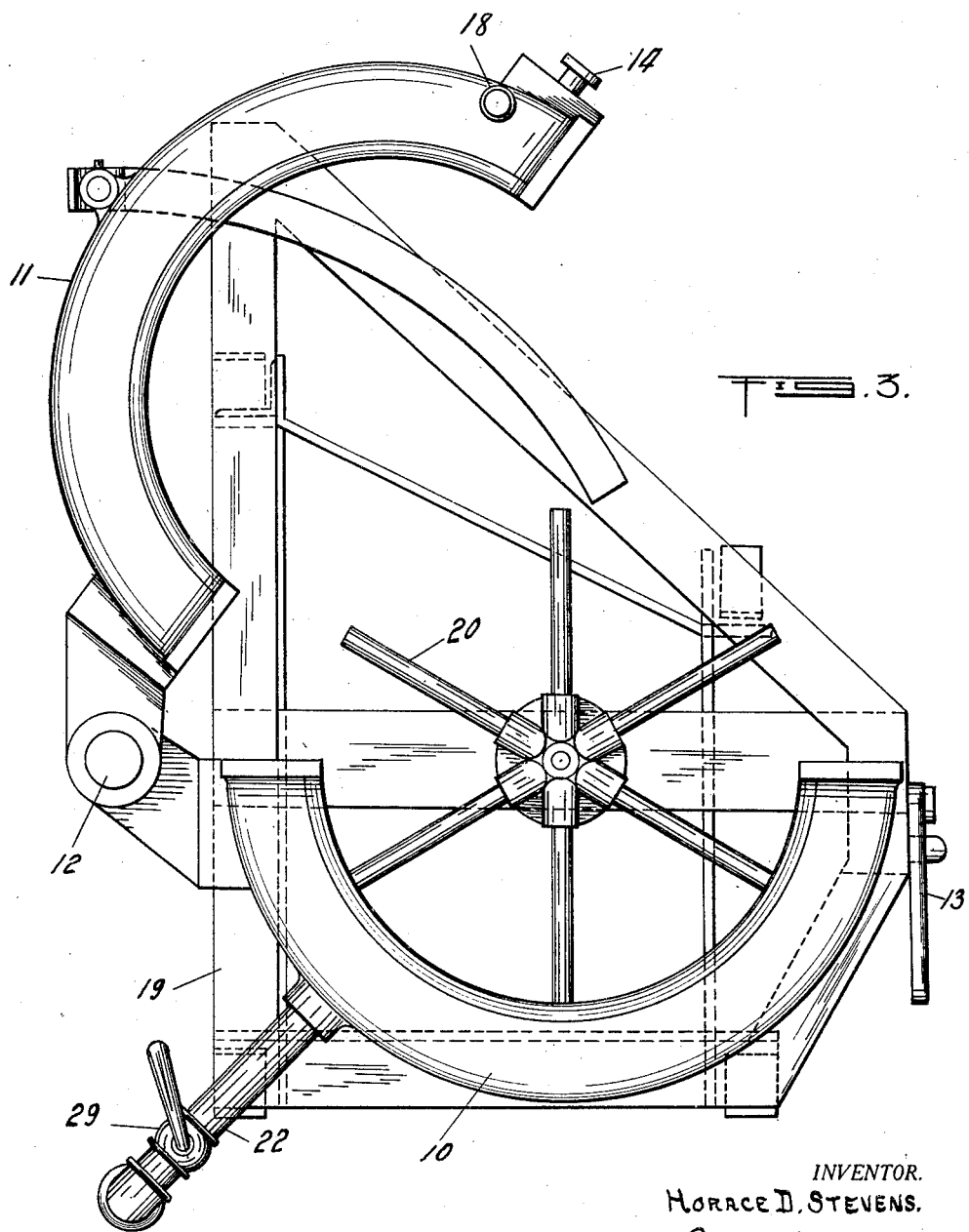

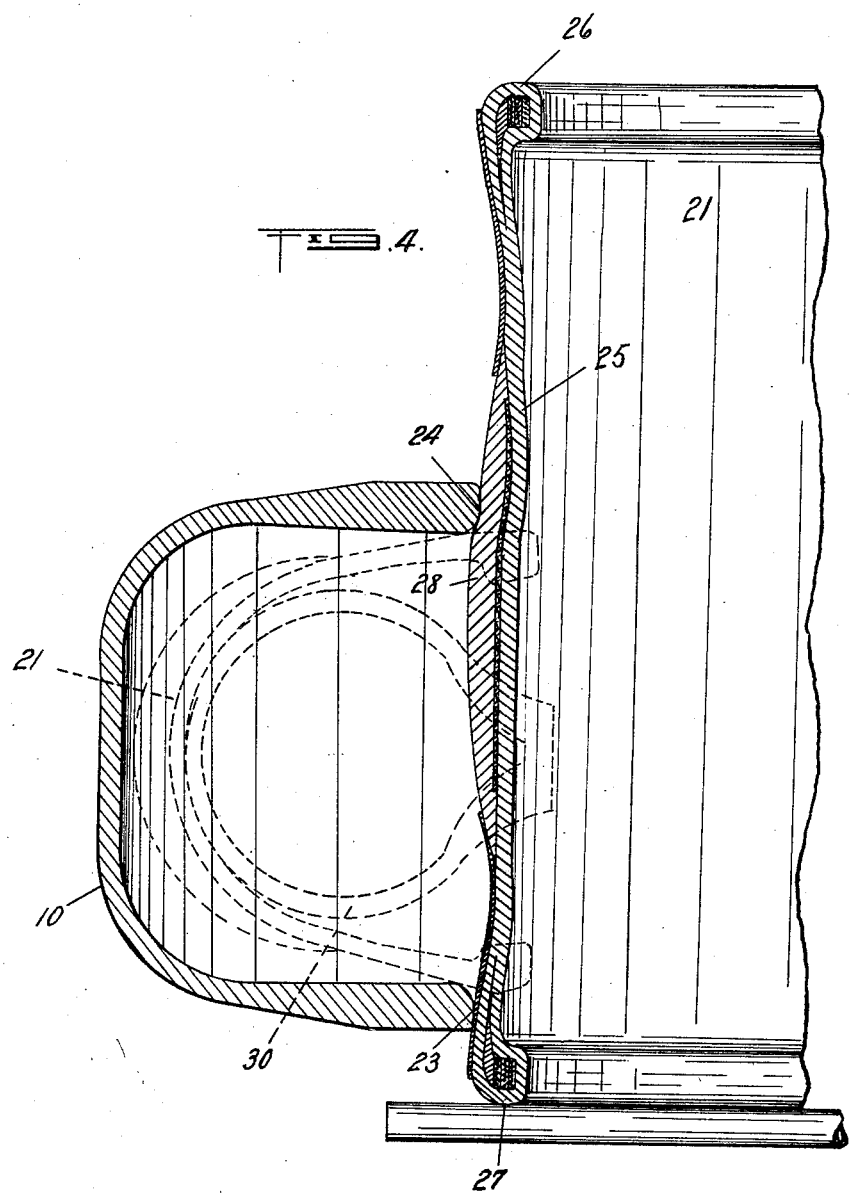

1,855,261

UNITED STATES PATENT OFFICE

HORACE D. STEVENS, OF AKRON, OHIO, ASSIGNOR TO THE FIRESTONE TIRE AND RUBBER COMPANY, OF AKRON, OHIO, A CORPORATION OF OHIO

TIRE SHAPING APPARATUS

Application filed May 16, 1928. Serial No. 278,322.

This invention relates to the manufacture of pneumatic tires of the flat band or "drum-built" type, and more particularly to an apparatus for and method of shaping or expanding the flat tire bands into tire shape while in the unvulcanized state.

The purpose of the present invention is to devise means for and method of expanding drum-built tires by means of a vacuum chamber adapted to be placed about the tire band.

Straight side drum-built tires in the flat band form are found to vary considerably in circumference on all portions thereof, excepting at the beads which are built about inextensible grommets of stranded wires. These variations are due mainly to non-uniformity of tension of the plies of the tires as applied by various tire builders, and to permitting the tires to stand for different periods of time before being expanded, during which time the flat band tires tend to shrink or pull radially inwardly between the beads due to the tension of the plies. It has accordingly been found difficult to provide a vacuum chamber to fit the ordinary factory run of flat tire bands of a given size due to circumferential variation.

Furthermore, a vacuum box in order to properly expand straight side tires having inextensible wire reinforced beads, must have an inner periphery of substantially the maximum outer peripheral diameter of the beads of the flat tire band in order that the tires when expanded may draw the beads to a position almost within the vacuum chamber. Accordingly, the problem cannot be solved by providing a vacuum chamber having such a small inner peripheral dimension as to be capable of forming sealing engagement with the circumferential portion of the tire having the minimum dimension, since such a device would not be capable of turning the beads during the expanding operation.

It has heretofore been proposed to shape drum-built tires by means of atmospheric pressure, placing the tire band within a vacuum chamber, sealing the chamber against the tire and forcing the beads axially together while drawing the tread portion radially outwardly. It has also been proposed to equip a vacuum chamber with flanges extending to the beads of the tire or with flexible sealing rings radially movable against the outer periphery of the tire to make a seal for the vacuum chamber. Another form of known vacuum chamber is used in combination with mechanical means for expanding the flat tire band against the edges of the chamber. All of these known forms of apparatus are intricate, cumbersome and subject to high upkeep costs in addition to being difficult to operate.

An object of the present invention, therefore, is to provide apparatus for and method of expanding drum-built tires by means of a vacuum chamber and without employing means for sealing the tires at the beads or with flexible or adjustable means engaging the periphery of the tire band. Another object of the invention is to devise a transversely split vacuum chamber, U-shaped in cross section and open on its inner periphery. A further object of the invention is to devise a transversely split vacuum chamber for expanding drum-built bands, the sections of the chamber being hinged together and being adapted to be opened and closed in a plane at right angles to the axis thereof. Still another object is to devise an annular vacuum chamber, open on its inner periphery, divided into sections on radial planes, each section being of integral construction. Still another object of the invention is to devise means for and method of supporting a flat tire band within a vacuum chamber having a single fixed sealing edge, so as to obtain a sealing contact between the tire and the chamber. A still further object is to provide a support in combination with a vacuum chamber whereby tires mounted on the support will be held within the chamber in an off-center position. Another object is to devise a method of sealing variable sized tire bands within a vacuum chamber by placing the tire within the chamber so as to engage one edge of the latter adjacent a bead of the tire, and the other edge of the chamber about the tread portion of the tire.

The foregoing and other objects are obtained by the apparatus illustrated in the accompanying drawings and by the structure and methods described below. It is to be understood that the invention is not limited to the specific form thereof described herein.

Figure 1 is a plan view of a vacuum chamber embodying the principles of the invention;

Figure 2 is a front elevation thereof;

Figure 3 is a plan view of the device in its open position; and

Figure 4 is an enlarged scale vertical transverse section of the vacuum chamber and a flat tire band placed therein.

Referring to the drawings, 10 and 11 are two sections of a transversely split annular vacuum chamber, U-shaped in cross section, the sections being hinged together about a pintle 12. The sections are adapted to be opened and closed by a movement in a plane transversely of the axis of the chamber, and are provided respectively with a latch 13 and a pin 14 for latching the sections together in a position as illustrated in Figure 1. Section 11 is formed with a bearing 15 in which is mounted a caster 16 adapted to roll along an arcuate track 17 as section 11 is moved to an open position as illustrated in Figure 3. A handle 18 is provided on section 11 to manipulate this movable portion of the chamber. The fixed section 10 of the chamber is mounted on a supporting frame 19 to elevate the chamber to a suitable height above the floor, the chamber preferably being mounted in a horizontal position. Also affixed to the frame is a spider 20 mounted co-axially with the chamber for supporting a drum-built tire band 21 therein. It will be understood that any desired form of floor or platform may be provided to support the tire in the proper manner with respect to the chamber. Exhaust line 22 is connected to fixed section 10 of the chamber to provide a vacuum therein when the tire is to be expanded.

The inner peripheral edges, 23 and 24 respectively of the vacuum chamber are preferably rounded to permit easy passage of the walls of the tire thereover. To make a proper seal the vacuum chamber is so proportioned as to squeeze the tire band radially inwardly as the chamber is closed, and so that the force of atmospheric pressure will draw the tire into the vacuum chamber when the latter is exhausted. The drum-built tire band illustrated in Figure 4, is of the usual construction having a body of cord fabric plies 25, beads 26 and 27, and a tread 28.

In the operation of the device to expand an unvulcanized tire band into tire shape, the chamber is opened to the position shown in Figure 3 and the tire band rested upon the support 19. Section 11 is then swung against the tire band and the sections locked together to clamp the tire within the chamber. Spider 20 is so positioned vertically with respect to the chamber that the lower inner peripheral edge 23 of the chamber will engage the tire adjacent the lower bead 27 thereof, while the upper inner peripheral edge 24 will engage the tire adjacent the tread 28 thereof. It will be understood that the position of the tire may be reversed and the upper edge 24 of the chamber engaged with the tire adjacent bead 26, while the lower edge 23 of the chamber engages the tread of the tire. A valve 29 in exhaust line 22 is next opened to exhaust air from the vacuum chamber and to form a partial vacuum therein. The tire will then be drawn radially outwardly into the channel of the chamber to the dotted line position shown in Figure 4, the tire automatically centering itself in the chamber and the beads turning to their proper position as shown. While the tire is thus held in its expanded condition by the vacuum, the usual inflatable air bag 30 may be positioned within the tire. If desired, however, the expanded tire may be removed from the chamber and the air bag subsequently inserted. The tire is finally completed by the usual vulcanization process.

The vacuum chamber will be found capable of expanding tires of various transverse sizes having the same bead diameter. Variations of the structure above described will suggest themselves to the skilled mechanic; for instance, the chamber if desired, may be chordally split, or may be split into three or more sections and all of these sections hinged together, or the sections need not be hinged but may be laterally movable. Furthermore, the chamber need not be annular in form but may be elliptical or irregular in contour since the unvulcanized flat tire bands are quite flexible and can be made to conform to other than annular chamber peripheries. Further modifications may be resorted to without departing from the spirit of the invention or the scope thereof as defined by the appended claims.

What is claimed is:

1. Apparatus for the shaping of flat built tire bands comprising an annular chamber, U-shaped in cross section and open on its inner periphery, said chamber being transversely split into two sections, one of which is relatively fixed and the other of which is hinged to the fixed section to be shiftable towards and from the same for opening the chamber and for closing the same about a flat built tire band, means positioned with respect to the chamber for supporting the band with one of its bead portions and its tread portion respectively in engagement with the inner peripheral edges of the chamber, and means for exhausting air from the chamber to expand the band to tire shape and to turn the beads thereof.

2. A transversely split hollow annular chamber open on its inner periphery, means for clamping in said chamber a flat built tire band, means for supporting a tire band with one of its bead portions adjacent an inner peripheral edge of the chamber, and means for evacuating said chamber.

3. A transversely split hollow annular chamber open on its inner periphery, means for clamping in said chamber a flat built tire band, the inner peripheral edges of the chamber being less in diameter than the diameter of the tire band, and means for evacuating said chamber.

4. A transversely split hollow annular chamber open on its inner periphery, and adapted to be closed about a flat built tire band, the inner peripheral edges of the chamber being less in diameter than the diameter of the tire band.

5. Apparatus for shaping flat built tire bands comprising a hollow chamber open on its inner periphery, said chamber being transversely split into a plurality of sections, the sections of the chamber being hinged together, and means for evacuating said chamber.

6. A transversely split hollow chamber open on its inner periphery, means for clamping in said chamber a flat built tire band, means for supporting the tire band in an off-center position in the chamber, and means for evacuating said chamber.

7. A transversely split hollow chamber open on its inner periphery, means for clamping in said chamber a flat built tire band, the inner peripheral edges of the chamber being less in diameter than the diameter of the tire band, and means for supporting the tire band in an off-center position in the chamber.

8. A device for shaping flat built tires comprising a transversely split hollow chamber open on its periphery, and means for exhausing air from the interior of said chamber.

9. A device for shaping flat built tires comprising a transversely split hollow chamber open on its inner periphery.

10. Apparatus for shaping flat built tires comprising a transversely split hollow vacuum chamber adapted to surround a flat built tire band.

11. Apparatus for shaping flat built tires comprising a transversely split hollow vacuum chamber adapted to surround a flat built tire band, and means for supporting said tire band in the chamber with one of its beads substantially closer to one side of the chamber than the distance from the other bead of the tire band to the other side of the chamber.

12. Apparatus for shaping flat built tires comprising a pair of arcuate channel sections adapted to be closed about a flat built tire band with the opening of the channel facing the tire band.

13. Apparatus for shaping flat built tires comprising a pair of integral arcuate channel sections adapted to be closed about a flat built tire band with the opening of the channel facing the tire band, the inner marginal edges of the channel sections being proportioned to substantially fit about the tire band adjacent one bead portion and the tread portion thereof.

14. Apparatus for shaping flat built tire bands comprising a plurality of integral arcuate metallic channel sections adapted to be closed about a flat built tire band, the inner marginal edges of the metallic channel sections engaging the outer surface of the tire band to seal the same from atmospheric pressure.

15. Apparatus for shaping flat band tire casings comprising an annular chamber provided by a pair of substantially semi-circular channel-shaped sections open at their inner peripheries, said channel-shaped section being relatively bodily movable between positions so separated that a tire band may be placed within the central space axially of said chamber and positions in cooperation to close about said tire band with the inner peripheries of the sections engaged with the outer surface of said tire band to seal the chamber against atmospheric pressure, and means for evacuating said chamber.

16. Apparatus for shaping flat band tire casings comprising a transversely split annular chamber including a plurality of arcuate channel-shaped sections open at their inner peripheries, said channel-shaped sections being relatively bodily movable between a position so separated that a tire band may be placed within the central space axially of said chamber and a position in cooperation to close about said tire band with the inner peripheries of the sections engaged with the outer surface of said tire band to seal the chamber against atmospheric pressure, means for drawing the sections together, and means for evacuating said chamber.

17. Apparatus for shaping flat band tire casing comprising a transversely split annular chamber including a plurality of arcuate channel-shaped sections open at their inner peripheries, said channel-shaped sections being relatively bodily movable between a position so separated that a tire band may be placed within the central space axially of said chamber and a position in cooperation to close about said tire band with the inner peripheries of the section engaged with the outer surface of said tire band to seal the chamber against atmospheric pressure, and means for evacuating said chamber.

HORACE D. STEVENS.